United States Patent [19]

Ward et al.

[11] 4,164,628
[45] Aug. 14, 1979

[54] PROCESSOR FOR MULTIPLE, CONTINUOUS, SPREAD SPECTRUM SIGNALS

[75] Inventors: Charles R. Ward, Passaic; Robert A. Reilly, North Caldwell, both of N.J.

[73] Assignee: International Telephone and Telegraph Corporation, Nutley, N.J.

[21] Appl. No.: 887,708

[22] Filed: Mar. 17, 1978

Related U.S. Application Data

[63] Continuation-in-part of Ser. No. 803,830, Jun. 6, 1977, abandoned.

[51] Int. Cl.² ............................................. H04J 13/00
[52] U.S. Cl. ........................... 179/15 BA; 179/15 BC
[58] Field of Search ................. 179/15 BA, 15 BC; 364/516, 607, 728, 819

[56] References Cited

U.S. PATENT DOCUMENTS

| | | | |
|---|---|---|---|
| 3,510,595 | 5/1970 | Gutleger | 179/15 BA |
| 3,518,547 | 6/1970 | Filipowsky | 179/15 BC |
| 3,691,364 | 9/1972 | Baba | 364/819 |
| 3,825,691 | 7/1974 | Honma | 179/15 BA |
| 3,947,672 | 3/1976 | Harrison | 364/728 |
| 4,016,412 | 4/1977 | Stern | 364/819 |

*Primary Examiner*—David L. Stewart
*Attorney, Agent, or Firm*—John T. O'Halloran; Alfred C. Hill

[57] ABSTRACT

This relates to a signal processor which accepts the linear sum of several continuous (CW) direct sequence, spread spectrum signals, and outputs a sequence of narrow pulses, each of which contains all the available energy of one of the input signals. The CW signals are applied to the input of a tapped delay line, the contents of which are compared, in a parallel fashion, with the output of a code storage register. When correlation has been achieved, a narrow pulse is produced which contains all the available energy of one of the input signals. The circuit reduces the problem of continuously processing several simultaneous signals, conventionally performed with dedicated circuitry for each signal, to a sequential pulse processing operation, effectively time-sharing the same single set of circuitry. Both amplitude and phase information is preserved through the processing technique allowing implementation in coherent and non-coherent system architectures.

4 Claims, 6 Drawing Figures

PROCESSOR FOR MULTIPLE, CONTINUOUS, SPREAD SPECTRUM SIGNALS

CROSS-REFERENCES TO RELATED APPLICATIONS

This is a continuation-in-part application of copending application Ser. No. 803,830, filed June 6, 1977 now abandoned.

BACKGROUND OF THE INVENTION

This invention relates generally to signal processors, and more particularly, to a signal processor for multiple continuous spread spectrum signals employing a tapped delay line.

The conventional approach of simultaneously processing multiple CW direct sequence signals employs parallel channels of circuitry each of which is dedicated to a particular signal. Within each channel of a coherent system, for example, there are three signal paths which may be designated early (E), punctual (P) and late (L). The E, P, and L outputs of a code generator are identical code sequences except that the P and L outputs are delayed in time by $\Delta/2$ and $\Delta$ seconds respectively with respect to the E code, where $\Delta$ is a time duration of a single code bit (chip). Each of these code sequences bi-phase modulates a local oscillator and is separately mixed with the received signals. The amplitude of the IF frequencies thus created at the output of each mixer is then proportional to the degree of code synchronization (correlation).

The punctual signal path is applied to a suppressed carrier Costas phase lock loop of the type fully described in the textbook "Spread Spectrum Systems," by R. C. Dixon, published by John Wiley and Sons, Inc. 1976. The Costas phase lock loop provides a coherent reference for detecting the amplitudes of the IF signals in the early and late paths. If the punctual code is not perfectly synchronized with the received code, an amplitude imbalance is created in the early and late paths which is proportional to the degree of synchronization error. This imbalance is detected by differencing the output of early and late path synchronized detectors. The resulting error voltage is then provided through a loop filter, the output of which controls the frequency of a code clock in such a manner as to maintain maximum synchronization in the punctual path.

Obviously, such an arrangement is both complex and expensive since the processing circuitry must be duplicated for each channel.

Timesharing techniques have also been developed in which only one channel is switched sequentially to process a number of simultaneously received signals. This approach, however, suffers an effective signal-to-noise ratio degradation proportional to the number of signals being processed. Additionally, due to sequential switching from channel to channel, only a fraction of the energy of each input signal can be utilized for processing.

SUMMARY OF THE INVENTION

It is an object of the present invention to provide a signal processor for multiple continuous spread spectrum signals that combines the performance advantages of a multiple channel system with the cost advantages of the single channel timesharing system.

It is a further object of this invention that the processing performance be optimum in that the total available signal power for each of the N input signals is utilized.

A feature of the present invention is the provision of an apparatus for decoding N spread spectrum pseudo randomly coded signals in the form of a single composite CW signal to form a plurality of pulses each containing all the information in one of the N signals, comprising: means for adjusting the bandwidth of the composite signal to a predetermined bandwidth; a tapped delay line for serially receiving the CW signal of the predetermined bandwidth; means for storing a pseudo random reference code corresponding to a preselected code segment of one of the N spread spectrum signals; comparison means for detecting correlation between the reference code and the one of the N signals; means for generating a pulse containing all the information in a segment of one of the N signals, the segment corresponding to the total delay time of the tapped delay line, the position of the pulse indicative of the degree of synchronization between the reference code and the first signal; and means for changing the reference code to one associated with another of the N signals.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
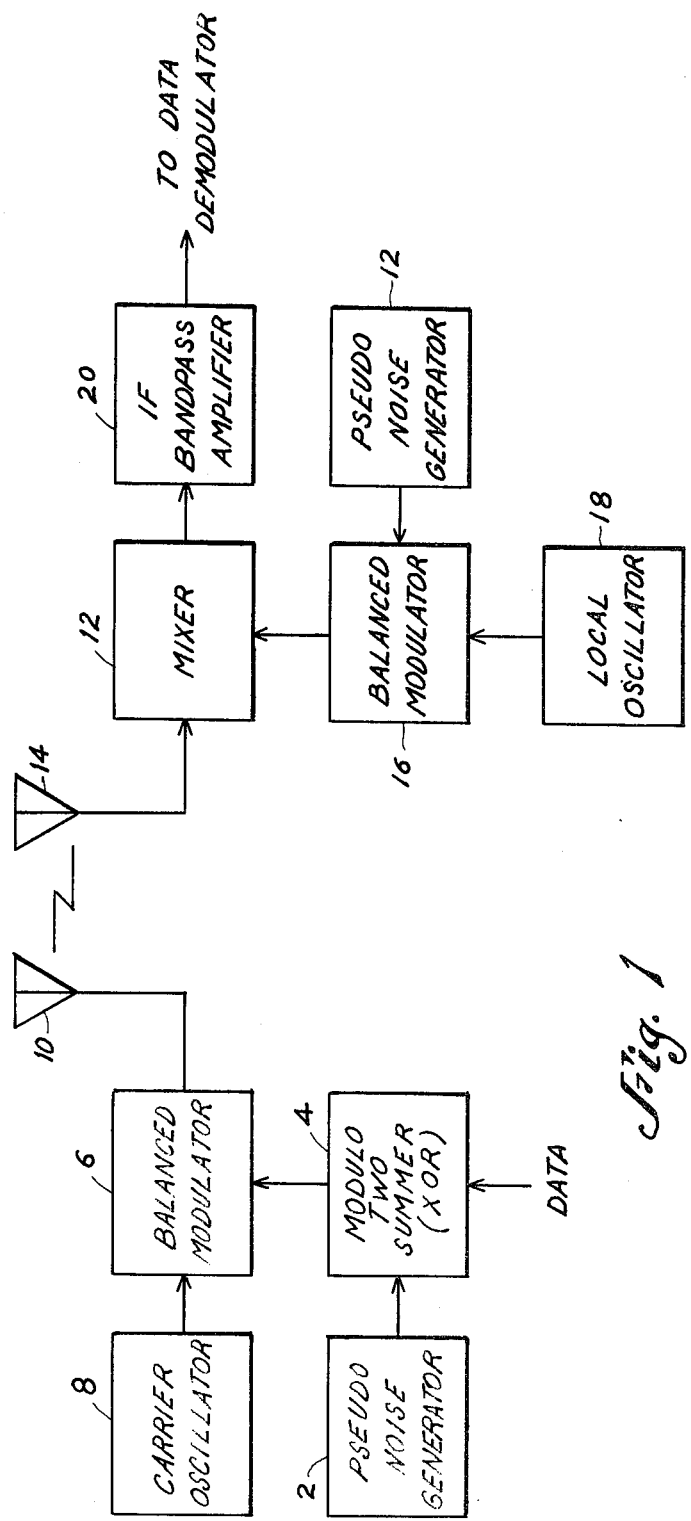
FIG. 1 is a block diagram of a conventional direct sequence spread spectrum system.

FIG. 1 is a simplified block diagram of a conventional direct sequence spread spectrum system. Data and a pseudo random code generated by pseudo noise generator 2 is modulo two added in summer 4, the output of which is applied to bi-phase modulator 6. A carrier signal generated by carrier oscillator 8 is bi-phased modulated in modulator 6 and transmitted to a receiving system via antenna 10.

The receiving system essentially performs the inverse process to recover the data. This is only possible if the pseudo noise generator 2 in the transmitter is time-synchronized with the pseudo noise generator 12 in the receiver system. This is accomplished by means of a code correlation tracking loop of the type fully described in the above-cited textbook. A more detailed discussion of the tracking loop is not deemed necessary at this time.

The received signal is applied to a mixer 12 via antenna 14. The output of pseudo noise generator 12 is used to bi-phase modulate, in balanced modulator 16, the output of local oscillator 18. The modulated signal is then mixed with the received signal in mixer 12 which strips the code and applies it to IF band pass filter 20 for subsequent application to the data demodulator.

Figure 2:
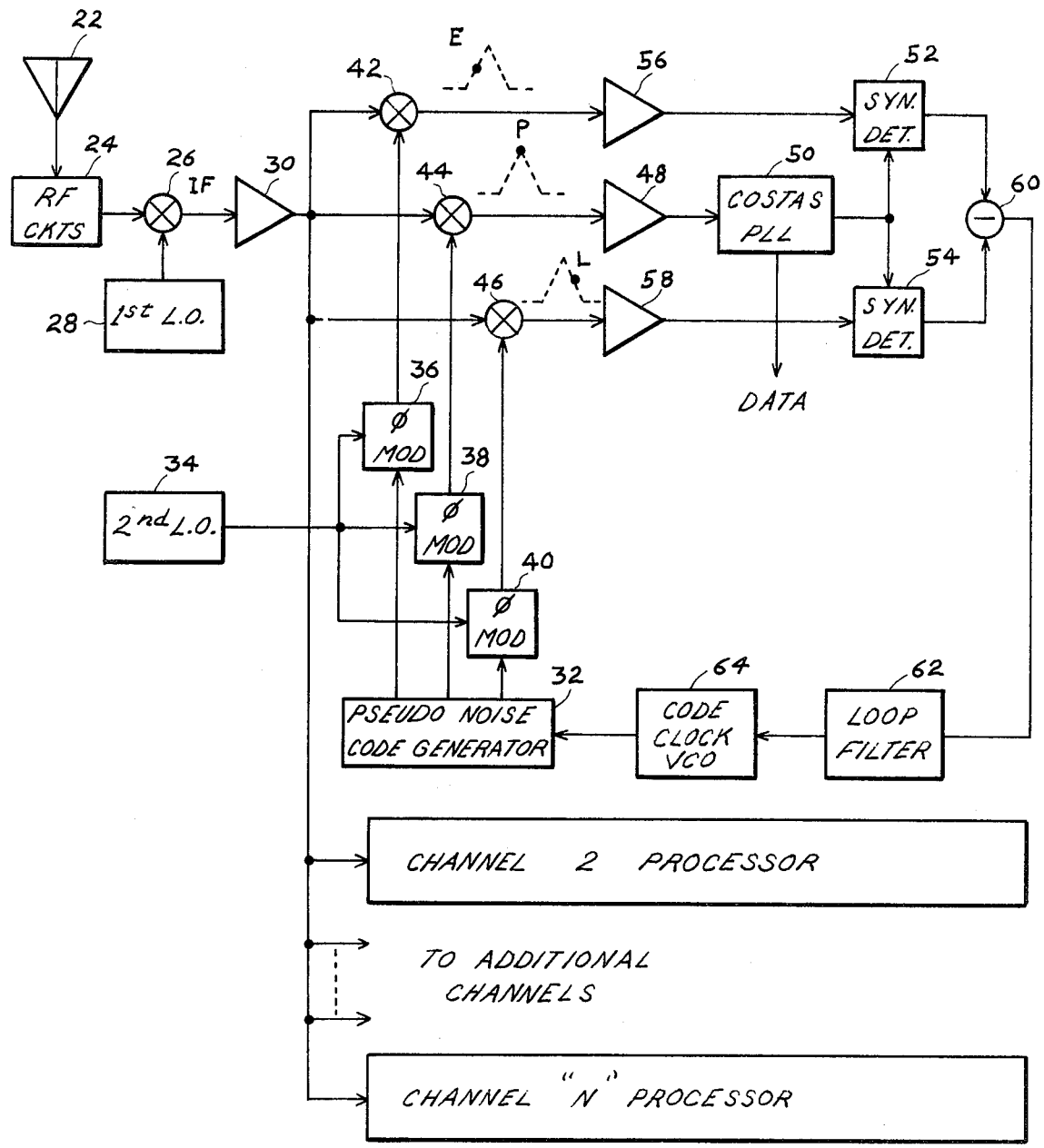
FIG. 2 is a block diagram of a conventional multiple CW direct sequence signal processor.

FIG. 2 is a simplified block diagram of a conventional multiple CW direct sequence signal processor employing parallel channels of circuitry each of which is dedicated to a particular signal. The CW signals are received by antenna 22 and applied to RF circuits 24. The outputs of the RF circuits are mixed in mixer 26 with the output of a first local oscillator 28 to reduce the frequency of the input signal according to well-known and conventional techniques. The signal is then applied to IF amplifier 30.

The circuitry for each channel comprises three signal paths designated early (E), punctual (P), and late (L). The E, P and L outputs of code generator 32 are identical code sequences except that the P and L outputs are delayed in time by $\Delta/2$ and $\Delta$ seconds, respectively, with respect to the E code, where $\Delta$ is the time duration of a single code bit (chip). Each of these code sequences bi-phase modulates the output of a second local oscillator 34 in modulators 36, 38 and 40, and the output of each of the modulators is separately mixed in mixers 42, 44 and 46, respectively, with the received signal. The amplitude of the IF signals created at the output of each of the mixers 42, 44 and 46 is then proportional to the degree of code synchronization (correlation). The punctual signal path is, after amplification in amplifier 48, applied to a Costas phase lock loop 50 which provides a coherent reference for detecting the amplitudes of the IF signals in the early and late paths. Phase lock loop 50 also provides the data on a separate output.

If the punctual code is not perfectly synchronized with the received code, an amplitude imbalance is created in the early and late paths which is proportional to the degree of synchronization error. This imbalance is detected by differencing the outputs of early and late paths in synchronous detectors 52 and 54 to which are applied the early and late IF signals after amplification in amplifiers 56 and 58, respectively. The resulting error voltage produced by difference network 60 is then applied to loop filter 62, the output of which controls the frequency of the code clock voltage controlled oscillator 64. The output of clock 64 is applied to a clock input of pseudo noise generator 32 thus maintaining maximum synchronization in the punctual path.

The circuitry above described is repeated in each of the N channels necessary to provide processing of N input signals.

Figure 3A:
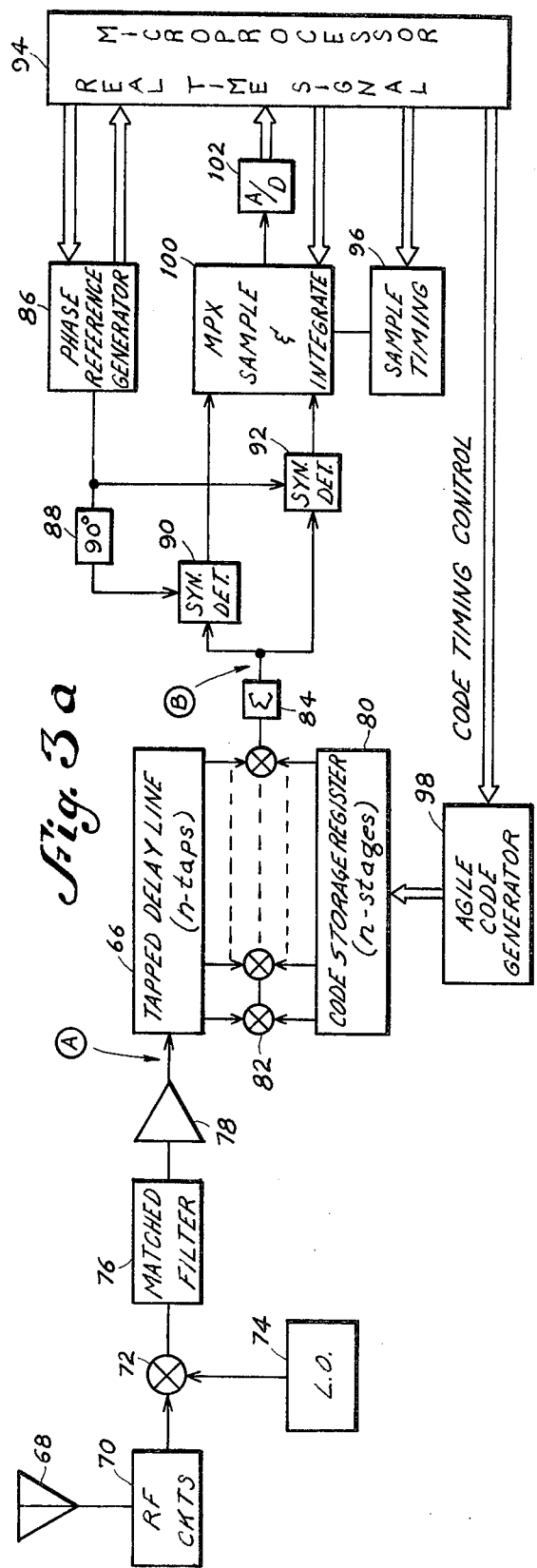
FIG. 3a is a block diagram of a tapped delay line signal processor for multiple continuous spread spectrum signals according to the principles of the present invention.

FIG. 3a is a simplified block diagram of a tapped delay line signal processor for multiple continuous spread spectrum signals according to the principles of the present invention. Tapped delay line 66 functions as a memory for the linear sum of the N input signals. To this end, delay line 66 may comprise a tapped analog delay line, a digital shift register, a surface acoustic wave correlator, etc. This memory feature provides the capability of temporarily deferring the processing of a particular real time segment of the composite input signal received via antenna 68 and RF circuitry 70 until some future, more convenient time within the overall delay time of delay line 66. It also provides the capability of processing the same time segment of the signal in different ways at different times.

The incoming signal is reduced in frequency by mixer 72 which is beat with the output of local oscillator 74 in accordance with known techniques. The output of mixer 72 is then applied to filter 76 which outputs only the signals of interest in a predetermined bandwidth and eliminates noise and interfering signals. The selected signals are then amplified in amplifier 78 prior to being applied to the input of delay line 66.

The input signal is decoded or correlated by comparison with the output of a code storage n-stage register 80 which is sequentially loaded with the N different bi-phase pseudo random codes associated with each of the incoming signals of interest. This is accomplished by means of code storage register 80 interfacing in parallel with tapped delay line 66 through a bank of phase switches 82 equivalent to analog multipliers. Each of the phase switches 82 pass the output of a particular delay line tap either in phase (0°) or out of phase (180°) into a summing $\Sigma$ network 84, depending upon the binary state of the corresponding bit in the code register 80.

Register 80 is in general a set of n flip flop circuits which stores a binary sequence of "ones and zeros" corresponding to the time ordered bi-phase modulation pattern of one of the spread spectrum signals. A new sequence determined by code generator 98 is loaded in parallel into register 80 just prior to the expected occurrence of a correlation pulse corresponding to the sequence. Register 80 is, therefore, holding a reference pattern which is being compared (correlated) against the composite signal outputs available at the respective tap outputs of delay line 66. Code generator 98 may, for example, be implemented as disclosed in our copending application Ser. No. 829,382, filed Aug. 31, 1977, whose disclosure is incorporated herein by reference.

As the composite signal travels through delay line 66, and if the correct code sequence for one of the desired signals is stored in the code register 80, a relatively narrow interval of time will occur when the received code in delay line 66 and the reference code in the code register 80 match, resulting in the coherent summation of the delay line taps in summing network 84.

Since filter 76 matched to the composite input signal spectrum procedes the tapped delay line 66, then the output of summing network 84 is a burst of signals at the IF frequency, the envelope of which is the auto correlation function of the code sequence. For bi-phase modulation, the envelope is triangular in shape and has a width of two $\Delta$. The resultant effect then is a time compression of the total energy of one of the desired signals (in the composite signal) over the total delay line 66 storage time to a reduced time of $2\Delta$.

It can be further seen that it is necessary to have the correct code sequence for the selected signals loaded in code register 80 only during the time the compressed signal pulse is being developed. Once the pulse has been developed, a new code for another signal in the composite signal input may be loaded into register 80 and its signal energy likewise compressed in time.

The above described process is repeated for each of the N signals in the composite signal, and after the last of the N signals is processed the next code sequence for the first, or original signal, is loaded back into register 80 to compress the next adjacent delay line segment of the first signal.

Figure 3B:
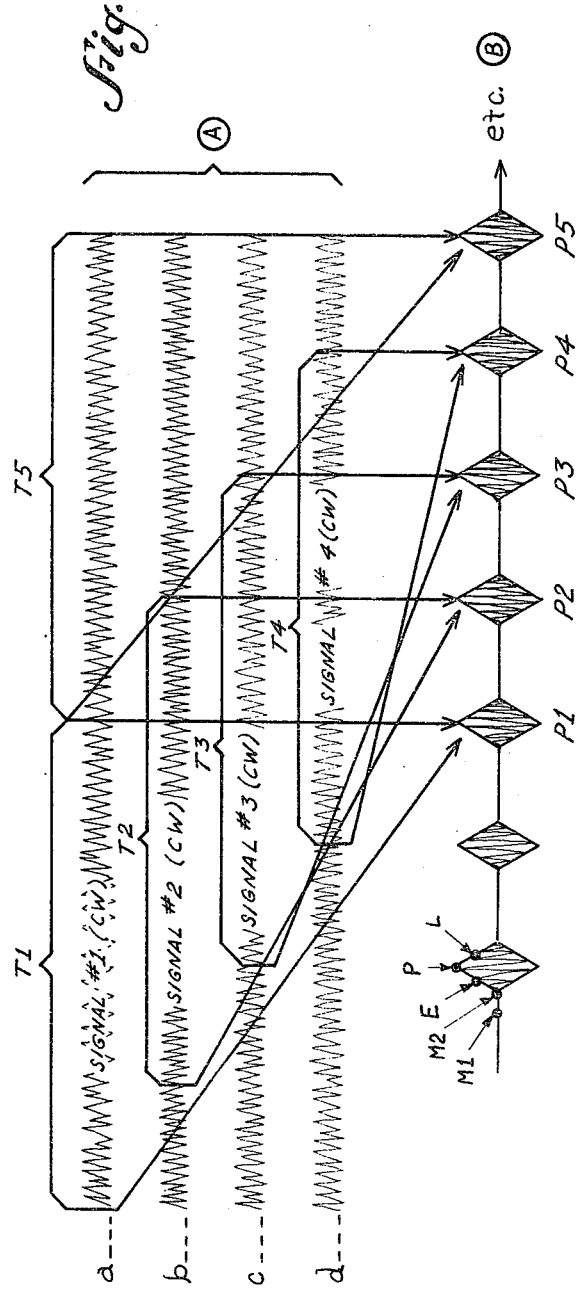
FIG. 3b shows waveforms illustrating the fundamental operation of regularly time compressing the energy of staggered delay line memory intervals.

The above described fundamental operation of regularly time compressing the energy of staggered delay line memory intervals for each of N signals is illustrated in FIG. 3b for the case where N=4. Lines a, b, c, and d represent each of the four continuous wave signals to be decoded which make up the composite input signal. As shown, the first segment of signal number 1 designated T1 is decoded and compressed to form pulse P1. Next, segment T2 of the composite signal is correlated with a second code and compressed to form pulse P2. A third code is then inserted into register 80 and segment T3 is decoded forming time compressed pulse P3. Finally a comparison of the composite input signal with a fourth code loaded into register 80 results in time compressed pulse P4. At this point, the next sequential segment of the original first code is loaded into register 80 and segment T5 of the composite input signal is decoded forming time compressed pulse P5. This process is continued thus utilizing all of the input power of the composite input signal.

Referring again to FIG. 3a, phase reference generator 86 is provided with an estimate of phase and doppler velocity for each of the N input signals and outputs a coherent reference for in-phase and quadrature detection via phase shifter 88 and synchronous detectors 90 and 92. The output of in-phase and quadrature synchronous detectors 92 and 90, respectively, are sampled at the peak of the time compressed pulse and represent the error voltages which are digitized and provided to a Costas phase tracking control loop mechanized in, for example, a microprocessor 94. Likewise, microprocessor 94 supplies the estimate of phase and doppler velocity for each of the N input signals to the in-phase and quadrature detectors.

The output of the Costas tracking loop are the new estimates of phase and velocity and update phase reference generator 86.

Microprocessor may be implemented as set forth in the above-cited textbook or in the article "A Fast Phase Locked Loop Algorithm With Applications To Microprocessors Implemented Communication And Navigation Systems," by B. E. Bjerede, AES Newsletter, September 1976, pages 26–31.

Figure 4B:
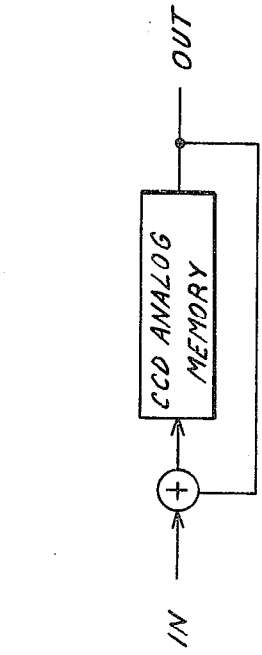
FIG. 4b shows a charge transfer analog memory with feedback.
Figure 4A:
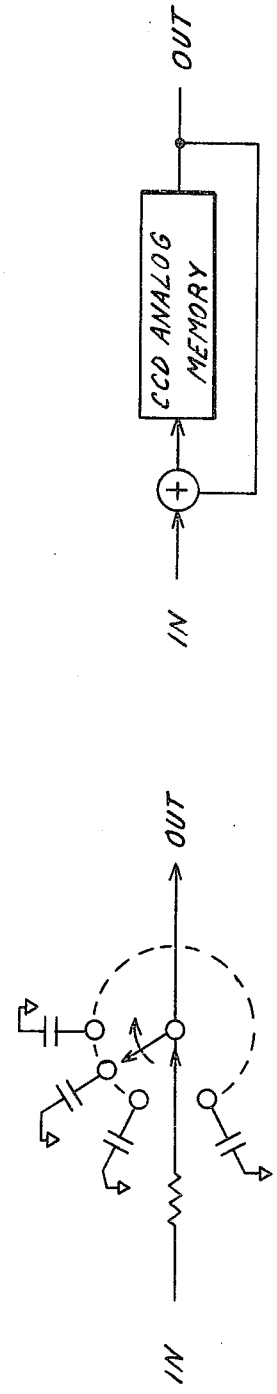
FIG. 4a shows an RC integrator.

Code tracking errors are developed by sampling the in-phase synchronous detector $\Delta/2$ second before and after the peak of the compressed pulse and differencing via sample and integrate 100. This error voltage is digitized in A/D converter 102 and provided to a code tracking loop in the microprocessor. The output of the code tracking loop provides time adjustments to sample timing circuits 96 to perform fine timing corrections, and advances or retards the code generator 98 by one code bit for larger code timing changes. In general, depending upon the specific application from which the total delay time is determined and the microprocessor input data rate, some intermediate integration of each of the error samples may be necessary prior to digitizing. This is easily accomplished by means of, for example, simple multiplex RC integrators as shown in FIG. 4a or charge transfer analog memories with feedback as shown in FIG. 4b. It should be noted that the tapped delay line signal processing technique is not dependent upon these intermediate integration methods. They are presented only to illustrate how the invention might be interfaced with a microprocessor in some system architectures.

Although, in general, at least four samples of the time compressed pulse are required for phase and code tracking (one in-phase peak and quadrature phase peak for phase tracking and data extraction, and one early and one late sample for code tracking), it may be desirable to take additional samples for multipath protection or for increasing signal acquisition speed. In any event, taking additional samples requires very little extra circuitry, i.e., only additional intermediate integration capacity.

In the description of FIG. 3a, a real time signal microprocessor 94 was employed to provide reference signals to phase reference generator 86, control signals to sample timing circuits 96 and a code timing control to code generator 98. However, this may likewise be accomplished by simply providing all sampled error measurements to conventional analog control system loop filters of the type illustrated in FIG. 2, such as loop filter 62.

The taps of the tapped delay line 66 are generally evenly spaced such that the differential delay between taps is equal to $\Delta$ which in turn is equal to the code chipping time. This implies that all of the N simultaneous CW signals must have the same or integrally related pseudo random code chipping rates. This is usually the case in most applications. On the other hand, if a tapped delay line is constructed in such a way as to allow the tap spacing to be controllable, then the above restriction would no longer exist.

There does exist a minimum total delay time of the delay line required in order to provide ample room for spacing between the compressed output pulses which is a function of $\Delta$ and N, the number of simultaneous signals being processed. Since each compressed pulse has a time duration of $2\Delta$ seconds and N such pulses are to be generated each delay time, the ideal lower limits of the total delay time is:

$$D_{MIN} = 2\Delta N \tag{1}$$

In practice, however, longer delay times may be required to provide adequate time aperture (K 2$\Delta$, where K is an appropriate constant greater than unity) for code timing error variation, multipath protection sampling, signal processing gain or due to performance limitations in the interfacing hardware.

The maximum offset frequency between the center frequencies of the N input signals determines the maximum delay time of the tapped delay line. In general, these frequency offsets are always present as doppler velocities if the signal transmitters are moving dynamically with respect to the receiver. The tapped delay line processor produces a band limiting characteristic due to progressive phase error which develops (with respect to the coherently spaced taps) as a frequency shifted signal propagates down the delay line. The progressive phase error is proportional to the delay time of the delay line.

The phase error creates a loss of output voltage for particular tap which is proportional to COS $2\pi f_d t$, where $f_d$ is frequency offset and t is the delay time of the tap. The average value of the normalized output voltage over the total delay time (T) of the delay line is:

$$\frac{1}{T} \int_o^T \cos 2\pi f_d t\, dt = \frac{\sin 2\pi f_d T}{2\pi f_d T}. \tag{2}$$

It can be seen that the tapped delay line processor has a (Sin X/X) bandpass transfer function. The maximum $f_d$ then is a function of the total delay time and the maximum tolerable loss for the doppler shifted signal.

The tapped delay line signal processor as shown in FIG. 3a is a linear system. The dynamic range required for linear performance is the ratio of the maximum voltage of the composite signal, noise and interference to the minimum voltage measurement resolution required by the system application. Large differential amplitudes in the N input signals increase the requirement for dynamic range.

In general, linear systems of this type require automatic gain control (AGC) for stable tracking loop performance. If dynamic range in the hardware is not a problem, then the AGC function can be accomplished entirely in the microprocessor 94 by scaling the measurement data. If the dynamic range of, for example, the synchronous detectors or A/D converters is a problem, then a digitally controlled AGC amplifier could be provided at the output of the tapped delay line summing network. This AGC amplifier would in general switch gain N times during one total delay time in an attempt to normalize the successive amplitudes of the time compressed output pulses.

The tapped delay line signal processor produces the same processing gain usually associated with direct sequence spread spectrum systems. Processing gain is essentially a signal to noise (or interference) ratio improvement factor. Processing gain results due to the coherent summation of signal vs. non-coherent summation of noise (or interference) over the n taps of the delay line. For a particular, single time compressed pulse at the output of the summing network, this processing gain may be approximated by:

$$G_p = \frac{(S/N)_o}{(S/N)_i} = n \quad (3)$$

where $(S/N)_o$ is the output signal to noise power ratio, and $(S/N)_i$ is the input signal to noise power ratio.

It must be emphasized that this processing gain is applicable to all N input signals simultaneously because each of the signal's total energy is explicitly stored in the tapped delay line 66.

It is to be noted that the above result is true because the auto-correlation function of the input effective noise between successive delay line taps is essentially zero. This is equivalent to each tap output being statistically independent.

If the processing gain resulting from a single time compression is adequate for the specific system application or design, additional processing gain is achieved by integration in the intermediate integrators (hardware) and/or in the signal microprocessor.

For system designs in which relatively small total delays are required, the obvious implementation for the tap delay line 66 would employ conventional distributed LC or transmission line delay lines. In most cases of practical interest, however, the cost and size of this approach becomes unmanageable.

Surface acoustic waves (SAW) devices have recently been developed which convert electromagnetic signals to acoustic vibrations which propagate down the surface of the piezoelectric substrate. Properly spaced transducers along the path of the acoustic signal perform the function of taps. Due to the relatively slow propagation velocity of the acoustic waves with respect to electromagnetic waves, very long total delays are achievable in small packages. Also, as the state of the art progresses, there is good potential legacy for dramatic cost and performance improvements. In terms of present state of the art, these devices represent the best choice in most cases, particularly for systems where the pseudo random code chipping rate is greater than one MHz.

Care must be taken to isolate conducted or radiated energy transients from the transducer taps. These transients can arise from loading new code sequences into register 80. If the programming noise is coupled to the tap transducers, they will launch acoustic energy themselves resulting in degraded noise performance of the system. Techniques such as one shot parallel code loading, and controlled switching rise times will minimize these problems.

A second alternative implementation of the tapped delay line would be in the form of charge transfer devices (CTD). These devices sample an input signal and store a quantity of electrical charge proportional to the magnitude of the sample in a monolithic capacitor or in a potential "well" created in the substrate of a semiconductor material. As successive samples are taken at a regular rate, previous sample charges are shifted to adjacent capacitors ("wells") to make room for the current samples. This technique creates the equivalent of a delay line or analog memory.

Since the representation of the analog input signal is in sampled form, the sampling rate must be at least twice (and probably three to four times) the highest frequency in the input signal spectrum. The input spectrum is the code modulation spectrum centered about the IF frequency. This implies that sampling rates must be approximately three to four times the IF frequency.

Charge transfer devices are limited with respect to sampling rate, a fact which must be considered if the tapped delay line 66 is to be implemented in the form of a charge transfer device.

An analog delay line may be implemented digitally by sampling the input analog signals, A/D converting and storing the digital representation of the sample as a word in a digital memory. As successive samples are processed, all previous digital words are shifted to adjacent word locations in the digital memory. Again, this is a sampling system and the sample rate criteria discussed above is applicable.

The number of bits or word size required for a linear system is a function of input dynamic range requirements. The number of words required is calculated by multiplexing the sampling rate by the total delay time required.

While this technique is limited by the large number of digital memory elements required for high code rate/long delay time/high dynamic range applications, it should be noted that in hard limiting IF systems, a word length of only bit may be required which reduces the memory requirements considerably.

In summary, the tapped delay line processing approach according to the principles of the present invention transforms the problem of processing N signals continuously in parallel (separate channels) to processing serially a sequence of N pulses. This approach offers several important advantages.

First, optimum signal processing performance is achieved in a sense that the total available signal power for each of the N-input signals is utilized.

Second, this technique offers hardware economy since all N input signals utilize the same common signal path. In particular, no dedicated IF channels are required for early and late code processing, and additionally, an insignificant amount of additional hardware is required in order to process additional signals at the input of the system.

Finally, there is a high degree of design flexibility in that many applications can be performed asynchronously. For example, the pseudo random code generators do not require precise timing of each code bit since it is only necessary to have a new code sequence ready and loaded in register 80 just prior to the expected occurrence of the time compressed pulse. Further, the pulse sampling techniques may be readily expanded to take additional samples, with a negligible increase in hardware, for multipath protection or for increasing search and acquisition performance.

While we have described above the principles of our invention in connection with specific apparatus it is to be clearly understood that this description is made only by way of example and not as a limitation to the scope of our invention as set forth in the objects thereof and in the accompanying claims.

We claim:

1. An apparatus for decoding N spread spectrum pseudo randomly coded signals in the form of a single composite CW signal to form a plurality of pulses each containing all the information in one of said N signal, comprising:
   means for adjusting the bandwidth of said composite signal to a predetermined bandwidth;
   a tapped delay line for serially receiving said CW signal of said predetermined bandwidth;
   means for storing a pseudo random reference code corresponding to a preselected code segment of one of said N spread spectrum signals;
   comparison means for detecting correlation between said reference code and said one of said N signals;
   means for generating a pulse containing all the information in a segment of one of said N signals, said segment corresponding to the total delay time of said tapped delay line, the position of said pulse indicative of the degree of synchronization between said reference code and said first signal; and
   means for changing said reference code to one associated with another of said N signals;

2. An apparatus for decoding according to claim 1 further including:
   means for sampling said pulse at predetermined points on said pulse;
   means for generating an error signal when the sampled points are different from said predetermined points; and
   means responsive to said error signal for adjusting the degree of synchronization of said locally generated code with said input signal segment.

3. An apparatus for decoding according to claim 2 further including:
   means for sampling the phase of said pulse;
   means for generating a phase reference;
   means for comparing said phase with said phase reference to generate an error signal when said phase is different from said phase reference; and
   means responsive to said error signal for adjusting the phase of said pulse to maintain phase synchronization.

4. An apparatus for decoding according to claim 2 further comprising:
   means for sampling the frequency of said pulse;
   means for comparing said frequency with the frequency of an internally generated reference signal;
   means for generating an error signal when said frequency is different from said reference frequency; and
   means responsive to said error signal for adjusting the frequency of said pulse to maintain frequency synchronization.

* * * * *